(12) United States Patent
Zhou et al.

(10) Patent No.: US 12,219,052 B2
(45) Date of Patent: Feb. 4, 2025

(54) BLOCKCHAIN NETWORK SECURITY COMMUNICATION METHOD BASED ON QUANTUM KEY

(71) Applicant: JINAN INSTITUTE OF QUANTUM TECHNOLOGY, Jinan (CN)

(72) Inventors: Fei Zhou, Jinan (CN); Jie Gao, Jinan (CN)

(73) Assignee: JINAN INSTITUTE OF QUANTUM TECHNOLOGY, Jinan (CN)

( * ) Notice: Subject to any disclaimer, the term of this patent is extended or adjusted under 35 U.S.C. 154(b) by 0 days.

(21) Appl. No.: 18/704,941

(22) PCT Filed: May 25, 2022

(86) PCT No.: PCT/CN2022/095087
§ 371 (c)(1),
(2) Date: Apr. 26, 2024

(87) PCT Pub. No.: WO2023/082599
PCT Pub. Date: May 19, 2023

(65) Prior Publication Data
US 2024/0421986 A1 Dec. 19, 2024

(30) Foreign Application Priority Data
Nov. 10, 2021 (CN) .......................... 202111323068.X

(51) Int. Cl.
*H04L 9/08* (2006.01)
*H04L 9/00* (2022.01)
*H04L 9/40* (2022.01)

(52) U.S. Cl.
CPC .......... *H04L 9/0852* (2013.01); *H04L 9/0819* (2013.01); *H04L 9/50* (2022.05); *H04L 63/0428* (2013.01)

(58) Field of Classification Search
CPC ....... H04L 9/0852; H04L 9/50; H04L 9/0819; H04L 63/0428
(Continued)

(56) References Cited

U.S. PATENT DOCUMENTS 11,233,639 B2 * 1/2022 Deng .................... H04L 9/3239
11,569,989 B2 * 1/2023 Barraza Enciso .... H04L 9/0869
(Continued)

FOREIGN PATENT DOCUMENTS

CN     110581763 A     12/2019
CN     111277404 A     6/2020
(Continued)

OTHER PUBLICATIONS

State Intellectual Property Office of the People's Republic of China, International Search Report issued in Application No. PCT/CN2022/095087, Aug. 11, 2022, 9 pages.

*Primary Examiner* — Amare F Tabor
(74) *Attorney, Agent, or Firm* — Kilpatrick Townsend & Stockton LLP

(57) ABSTRACT

Disclosed in the present disclosure is a blockchain network security communication method based on a quantum key. On the basis of a blockchain network formed by means of combining quantum key distribution technology and blockchain technology, the method implements the process of quantum key distribution, acquisition and encryption transmission with simple steps which are easy to control and implement, to ensure the secure conduction of communication services in the blockchain network.

10 Claims, 3 Drawing Sheets

(58) Field of Classification Search
USPC .......................................................... 713/160
See application file for complete search history.

(56) References Cited

U.S. PATENT DOCUMENTS

| | | | | |
|---|---|---|---|---|
| 11,621,836 B2* | 4/2023 | Ashrafi | ................ | H04L 9/3239 |
| | | | | 713/171 |
| 11,641,364 B2* | 5/2023 | Olson | .................... | H04L 63/20 |
| | | | | 726/1 |
| 11,646,900 B2* | 5/2023 | Ratakonda | ............ | H04L 9/3297 |
| | | | | 713/178 |
| 11,658,824 B2* | 5/2023 | Shrinivasan | .......... | H04L 9/0861 |
| | | | | 713/164 |
| 11,664,973 B2* | 5/2023 | Gaur | .................... | H04L 9/0637 |
| | | | | 380/37 |
| 11,683,185 B2* | 6/2023 | Naumov | .................. | H04L 9/50 |
| | | | | 713/175 |
| 11,693,979 B2* | 7/2023 | Biazetti | .................. | H04L 63/12 |
| | | | | 726/29 |
| 11,695,552 B2* | 7/2023 | Szczepanik | ........... | G06F 21/606 |
| | | | | 713/193 |
| 11,695,573 B2* | 7/2023 | Olson | ................... | H04L 9/3255 |
| | | | | 713/176 |
| 11,711,202 B2* | 7/2023 | Jayachandran | .... | G06Q 20/3827 |
| | | | | 713/150 |
| 11,736,456 B2* | 8/2023 | Manevich | ............ | H04L 63/061 |
| | | | | 713/171 |
| 2021/0126779 A1 | 4/2021 | Barraza Enciso et al. | | |

FOREIGN PATENT DOCUMENTS

| | | |
|---|---|---|
| CN | 113765664 A | 12/2021 |
| CN | 113765665 A | 12/2021 |

* cited by examiner

-- Prior Art --

BLOCKCHAIN NETWORK SECURITY COMMUNICATION METHOD BASED ON QUANTUM KEY

CROSS REFERENCE OF RELATED APPLICATION

The present application is the national phase of International Patent Application No. PCT/CN2022/095087, filed on May 25, 2022, which claims the priority to Chinese Patent Application No. 202111323068.X, filed on Nov. 10, 2021 with the China National Intellectual Property Administration, both of which are incorporated herein by reference in their entireties.

FIELD

The present disclosure relates to the field of quantum information, and in particular to a secure communication method applied to a quantum-secured blockchain network.

BACKGROUND

Blockchain is an innovative application mode of computer technologies such as distributed data storage, point-to-point transmission, consensus mechanism, and encryption algorithm in the Internet era. The blockchain has been widely applied in various fields such as Internet of things, intelligent manufacturing, supply chain management, and digital asset trading.

FIG. 1 is a schematic diagram illustrating a typical blockchain network. As shown in FIG. 1, the blockchain network includes multiple blockchain nodes connected through optical fiber links. Secure data transmission between blockchain nodes is underpinned by cryptography. At present, the data is generally encrypted using a symmetric cryptographic algorithm that performs fast in encryption and decryption. However, a symmetric key applied to the symmetric cryptographic algorithm is distributed by an asymmetric cryptographic system. A data sender randomly generates the symmetric key using a classical random number generator first, then encrypts the symmetric key using a private key of the sender and finally transmits the encrypted symmetric key to a receiver. The receiver decrypts the symmetric key using a public key of the sender, to obtain plaintext of the symmetric key, and then performs the secure data transmission with the sender using the symmetric key. Therefore, security of data transmission in the current blockchain network depends on security of the symmetric key: A leak of the key may cause data theft or data corruption.

As described above, the symmetric key is randomly generated by a random number generator at one end, encrypted using the asymmetric key and transmitted to a node at an opposite end nowadays. However, the asymmetric key dependent on computational complexity is prone to decipherment as the computing capability advances, exposing the symmetric key to a risk of leakage. In addition, the symmetric key is generated by a classical random number generator. Based on the certainty principle of the classical physics, the generated data sequence is predictable once all conditions are known. The symmetric key will be leaked if the random number is deciphered, and consequently the entire blockchain network is insecure.

SUMMARY

In view of the above problem existing in the blockchain network, a secure communication method employing a quantum key is provided according to the present disclosure, applied a blockchain network combining the QKD technology and the blockchain technology. With the proposed secure communication method, the quantum key can be distributed, acquired and securely transmitted through a few more steps, to securely perform communication services across the blockchain network.

A secure communication method applied to a quantum-secured blockchain network is provided according to the present disclosure. The blockchain network includes a blockchain subnet and a quantum key distribution subnet. The blockchain subnet includes multiple blockchain nodes, and the quantum key distribution subnet includes multiple quantum key distribution nodes. The multiple quantum key distribution nodes are deployed in the blockchain nodes and connected to the blockchain nodes respectively.

The secure communication method includes: a quantum key distribution step for generating a shared quantum key between two of the quantum key distribution nodes: a connection information upload step for uploading correspondence of the blockchain node to a quantum key management device in the quantum key distribution node connected to the blockchain node to the blockchain subnet: a quantum key acquisition step for acquiring the shared quantum key by the blockchain node from the quantum key distribution node connected to the blockchain node, based on a communication service; and a secure communication step for securely transmitting transmission data by the blockchain nodes using the shared quantum key.

Further, the quantum key acquisition step includes: acquiring an identity of the quantum key management device in a receiver from the blockchain subnet by a sender, and acquiring the shared quantum key for the sender and the receiver based on the identity by the sender from the quantum key management device in the quantum key distribution node deployed in the sender; and acquiring the shared quantum key from the quantum key management device by the receiver based on the identity. The sender and the receiver are among the blockchain nodes.

Further, the blockchain nodes include a terminal device and a blockchain node server. The quantum key acquisition step includes: injecting, by the same quantum key distribution node, a quantum random number or a quantum key to the terminal device and the blockchain node as the shared quantum key, in a case that the terminal device and the blockchain node server are connected to the same quantum key distribution node: or distributing the shared quantum key to the terminal device and the blockchain node server by quantum key management devices in the respective quantum key distribution nodes, in a case that the terminal device and the blockchain node server are connected to the different quantum key distribution nodes.

Further, the secure communication step includes: encrypting the communication data using the shared quantum key for the blockchain node server to generate ciphertext data, and generating a message authentication code based on the shared quantum key and the communication data, by the terminal device; and decrypting the ciphertext data using the shared quantum key to obtain the communication data, generating a message authentication code based on the shared quantum key and the communication data, and comparing the generated message authentication code with the received message authentication code, by the blockchain node server.

Further, the secure communication step includes: encrypting the communication data using the shared quantum key for the receiver to generate ciphertext data, and generating a message authentication code based on the shared quantum key and the communication data, by the sender; and decrypting the ciphertext data using the shared quantum key to obtain the communication data, generating a message authentication code based on the shared quantum key and the communication data, and comparing the generated message authentication code with the received message authentication code, by the receiver.

In an embodiment, the communication data is encrypted with one-time pad using an XOR encryption algorithm. The message authentication code is generated using an HMAC algorithm or a CBC MAC algorithm. The communication data includes one or more of transaction information broadcast data, transaction information verification broadcast data, and shared data.

Further, the quantum key distribution subnet includes a user terminal node for providing the shared quantum key to a user device, a trusted relay node for relaying the shared quantum key between two quantum key distribution nodes that are not directly connected, and a centralized control node. The centralized control node is a trusted relay node where a control server is deployed.

Further, the centralized control node and the trusted relay node are further for providing the shared quantum key to the user device. At least two of the quantum key distribution nodes include a quantum satellite ground station for establishing a free space link with a quantum satellite.

Further, adjacent quantum key distribution nodes communicates with each other through an optical fiber link or a free space link.

Further, a quantum key distribution node including a mobile quantum satellite ground station is deployed in a mobile blockchain node.

BRIEF DESCRIPTION OF THE DRAWINGS

The embodiments of the present disclosure are described in detail below in conjunction with the drawings.

In order to clearly illustrate the embodiments of the present disclosure, the drawings used in the description of the embodiments will be briefly introduced below. The drawings in the following description merely show some embodiments of the present disclosure.

DETAILED DESCRIPTION

Figure 1:
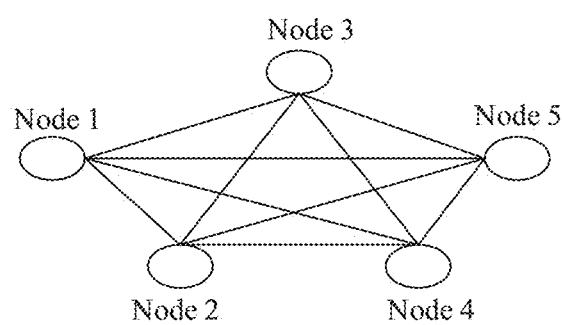
FIG. 1 is a schematic diagram illustrating a typical blockchain network according to the prior art.

Hereinafter, exemplary embodiments of the present disclosure will be described in detail with reference to the drawings. The following embodiments are provided in a manner of example for fully conveying the embodiments of the present disclosure. Therefore, the present disclosure is not limited to the embodiments disclosed herein.

According to the present disclosure, the blockchain network includes a blockchain subnet and a quantum key distribution subnet, for implementing the secure communication method employing a quantum key.

The blockchain subnet includes multiple blockchain nodes that communicate with each other. In some embodiments, the blockchain nodes include a terminal device, for example, a handheld terminal. The handheld terminal communicates with the server in the blockchain nodes, to implement communication services such as shared data transmission, blockchain transaction information broadcasting, and blockchain transaction information verification broadcasting.

The quantum key distribution subnet includes multiple quantum key distribution nodes. A shared quantum key is generated between two quantum key distribution nodes through quantum key distribution.

The quantum key distribution nodes include a centralized control node, a trusted relay node, a user terminal node and the like.

The user terminal node provides a quantum key to a user device. For example, the user terminal node includes a quantum key injection device, a quantum key management device and a quantum key distribution device. The quantum key distribution device performs quantum key distribution between two nodes based on quantum mechanics. The quantum key management device manages the distributed quantum key, for example, storages the quantum key and output the quantum key: The quantum key injection device acquires, based on a quantum key demand, a quantum key or quantum random number from the quantum key management device, and injects the quantum key or quantum random number to the user device connected to the quantum key injection device.

The trusted relay node relays the quantum key between quantum key distribution nodes that are not directly connected, and provides the quantum key to the user device generally. For example, the trusted relay node includes a quantum key injection device, a quantum key management device, and a quantum key distribution device.

The centralized control node is a special trusted relay node where a control server serving the entire quantum key distribution subnet is deployed. For example, the trusted relay node includes a quantum key injection device, a quantum key management device, a quantum key distribution device and a control server.

According to the present disclosure, the quantum key distribution subnet is deployed in different manners by means of the optical fiber link and/or the free space link, depending on the specific architecture of the blockchain subnet.

According to the present disclosure, the quantum key distribution nodes are deployed in the blockchain nodes, for the blockchain nodes to acquire the shared quantum key from the quantum key distribution nodes, respectively. The quantum key distribution nodes are adapted to corresponding blockchain nodes.

For example, a quantum key distribution node including a (mini) mobile quantum satellite ground station is deployed in a mobile node. Therefore, the quantum key distribution node can distribute the quantum key through the ground station and the quantum satellite, and transmit the quantum key to the quantum key management device for storage. Therefore, the blockchain node can securely communicate with the quantum key distribution node (for example, the quantum key management device) to obtain the quantum key.

In an embodiment, a blockchain node is provided with a terminal device, for example, a handheld terminal. The quantum key distribution node is configured to inject the quantum key to the handheld terminal and the blockchain node server, and the handheld terminal can communicate with the server in an encrypted manner by means of the quantum key:

Therefore, communication services can be securely performed across the blockchain network by means of the quantum key: According to the present disclosure, the secure communication method includes: a quantum key distribution step, a connection information upload step, a quantum key acquisition step, and a secure communication step.

Figure 2:
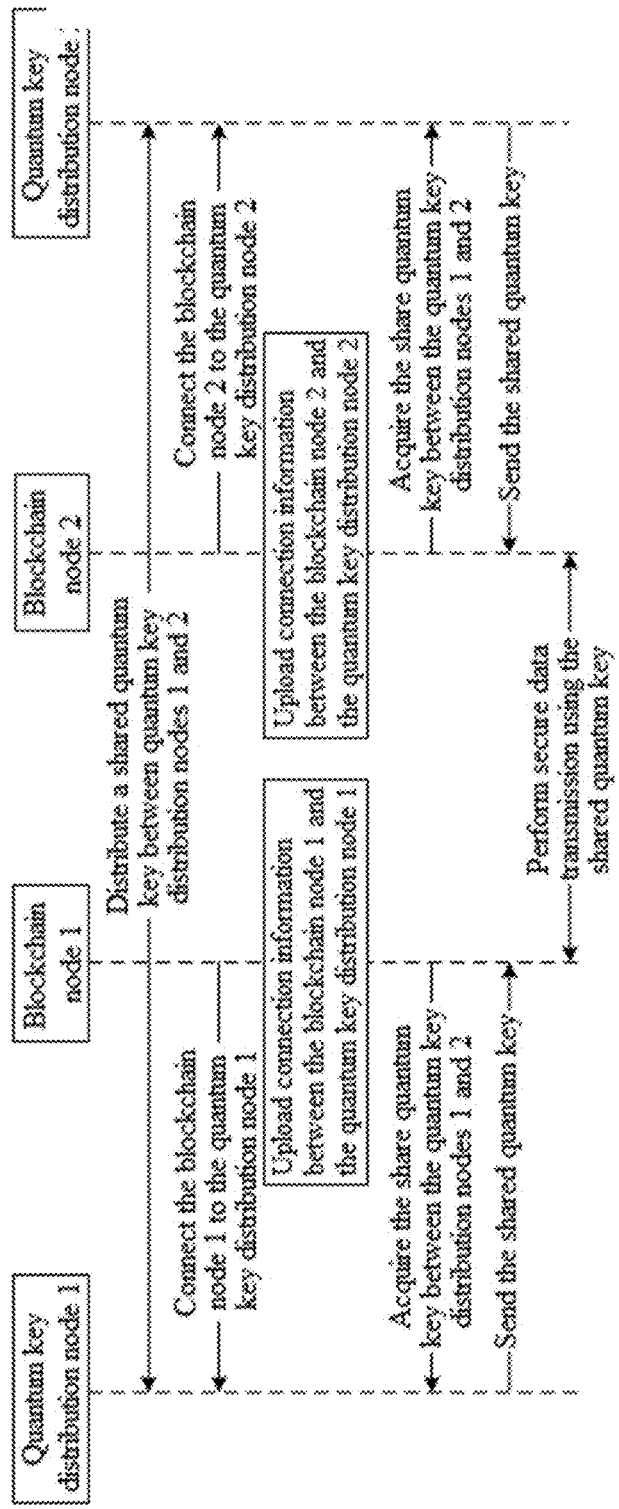
FIG. 2 is a schematic diagram illustrating an example of a secure communication method applied to a quantum-secured blockchain network according to an embodiment of the present disclosure.

FIG. 2 shows an example of the secure communication method according to the present disclosure. Secure communication is performed between the blockchains 1 and 2.

In the quantum key distribution step, a shared quantum key between two of the quantum key distribution nodes is generated. That is, quantum key management devices in the quantum key distribution nodes generate the shared quantum key through an optical fiber link and/or a free space link.

As shown in FIG. 2, the shared quantum key is distributed between the quantum key distribution nodes 1 and 2.

In the connection information upload step, correspondence of the blockchain node to a quantum key management device in the quantum key distribution node connected to the blockchain node is uploaded to the blockchain subset, and any blockchain node in the blockchain node can access the correspondence. Therefore, a blockchain node, when to communicate with another blockchain node, acquires an identity of the quantum key management device in its counterpart from the correspondence stored in the blockchain, and acquires the shared quantum key based on the identity.

As shown in FIG. 2, after the connection between the blockchain node 1 and the quantum key distribution node 1, and the connection between the blockchain node 2 and the quantum key distribution node 2 are established, the correspondence between the blockchain node 1 and the quantum key distribution node 1 and the correspondence between the blockchain node 2 and the quantum key distribution node 2 are uploaded to the blockchain.

In the quantum key acquisition step, the blockchain node acquires the shared quantum key from the corresponding quantum key distribution node.

In the quantum key acquisition step, the blockchain node acquires the identity of the quantum key management device in its counterpart involving in the communication, and acquires the shared quantum key employed for the blockchain node and its counterpart from the quantum key management device in the quantum key distribution node deployed in the blockchain node. Further, the quantum key management device has the identity provides the shared quantum key to the counterpart. Therefore, the generated shared quantum key can be distributed between a sender and a receiver in the blockchain network that involve in the communication service, to securely perform the communication service between the sender and the receiver.

As shown in FIG. 2, the blockchain nodes 1 and 2 request the shared quantum key from the quantum key distribution nodes 1 and 2, respectively. The quantum key distribution node 1 sends the shared quantum key to the blockchain node 1. The quantum key distribution node 2 sends the shared quantum key to the blockchain node 2.

In an embodiment, the blockchain nodes include the terminal device e.g., a handheld terminal. A shared quantum key is distributed between the handheld terminal and the blockchain node server, for secure communication between the handheld terminal and the blockchain node server. Therefore, in the quantum key acquisition step, in a case that the handheld terminal and the blockchain node server are connected to the same quantum key distribution node, the quantum key distribution node injects a quantum random number to the handheld terminal and the blockchain node server, as the shared quantum key. In a case that the handheld terminal and the blockchain node server are connected to different quantum key distribution nodes, the quantum key management devices in the quantum key distribution nodes provide the shared quantum key to the handheld terminal and the blockchain node server, respectively.

In the secure communication step, transmission data is encrypted using the shared quantum key and then is transmitted, for protecting its completeness. As shown in FIG. 2, the data transmitted between the blockchain nodes 1 and 2 is encrypted using the shared quantum key, and therefore can be securely transmitted between the blockchain nodes 1 and 2.

In the secure communication step, the sender encrypts the communication data using the shared quantum key employed for the receiver to generate ciphertext data, generates a message authentication code based on the communication data with the shared quantum key as an input key, and sends the message authentication code together with the ciphertext data to the receiver. The receiver decrypts the ciphertext data using the shared quantum key to obtain plaintext of the communication data, generates a message authentication code based on the communication data with the shared quantum key as an input key, and compares the received message authentication code with the generated message authentication code to verify integrity.

For the communication between blockchain node server and the terminal device, for example, the handheld terminal in the blockchain node, similarly the sender generates ciphertext data and a message authentication code using the shared quantum key, and the receiver decrypts the ciphertext data using the shared quantum key to generate the plaintext of communication data and generates a message authentication code to be compared with the received message authentication code for integrity-checking, to guarantee security of the communication data.

According to the present disclosure, the communication data is encrypted with one-time pad using an XOR encryption algorithm. The message authentication code is generated based on an HMAC algorithm (hash algorithm) or a CBC MAC algorithm (symmetric encryption algorithm).

The secure communication method according to the present disclosure is described by example below with reference to FIG. 3, which is a schematic diagram illustrating a blockchain network applicable to the secure communication method according to an embodiment of the present disclosure.

Figure 3:
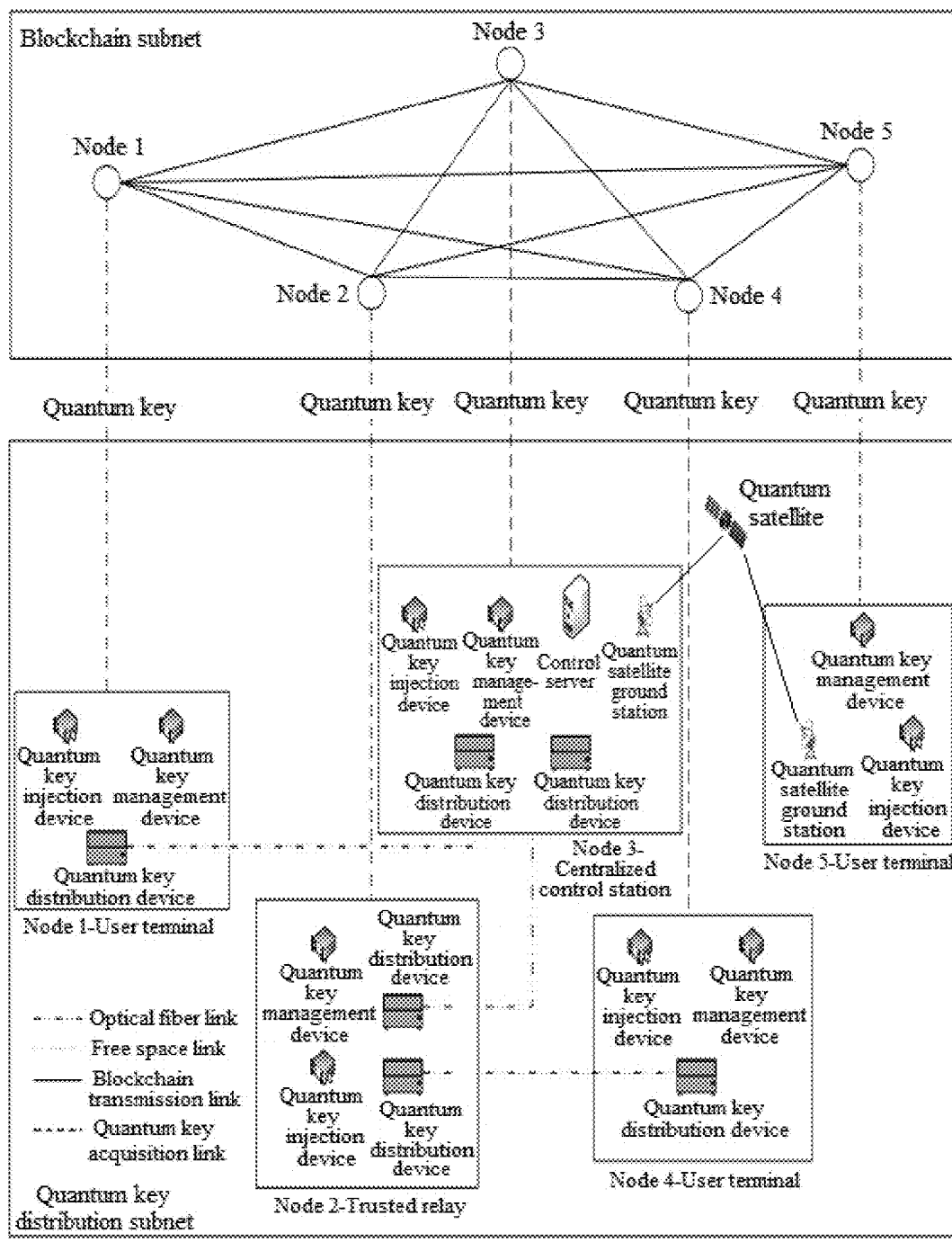
FIG. 3 is a schematic diagram illustrating a blockchain network applicable to the secure communication method according to an embodiment of the present disclosure.

As shown in FIG. 3, the blockchain subnet includes five blockchain nodes 1 to 5.

The quantum key distribution subnet includes five quantum key distribution nodes 1 to 5, deployed in the blockchain nodes 1 to 5 and securely connected to the blockchain nodes 1 to 5, respectively. Quantum key distribution nodes 1, 4 and 5 each serve as a user terminal node, and quantum key distribution nodes 2 and 3 each are a trusted relay node. A control server is deployed in the quantum key distribution node 3, and therefore the quantum key distribution node 3 serves as a centralized control station. The quantum key distribution nodes 1 to 4 are connected through optical fiber links, while no optical fiber link is arranged between the quantum key distribution node 5 and each of the quantum key distribution nodes 1 to 4. Instead, quantum satellite ground stations are arranged in the quantum key distribution nodes 5 and 3, and therefore a free space link is established between the quantum key distribution nodes 5 and 3.

In the blockchain network, the blockchain node 1 sends broadcast message to the blockchain node 2 to 5.

In the quantum key distribution step, the shared quantum key is distributed through the ground optical fiber link between quantum key distribution nodes 1 and 3, between quantum key distribution nodes 2 and 3, and between quantum key distribution nodes 2 and 4, and further securely stored in a key management device. The quantum key distribution node 3 is far away from the quantum key distribution node 5, or the quantum key distribution node 5 is deployed in the mobile blockchain node, and then the quantum key is distributed or relayed between the two nodes through the free space link formed between the quantum satellite and the ground station. In this way, each two of the quantum key distribution nodes 1 to 5 can share a quantum key.

In the connection information upload step, blockchain nodes 1 to 5 upload, to the blockchain, correspondence of the blockchain nodes 1 to 5 to the quantum key management devices in the quantum key distribution nodes 1 to 5 connected blockchain nodes 1 to 5, respectively.

In the quantum key acquisition step, the blockchain node 1 acquires the identities of quantum key management devices corresponding to blockchain nodes 2 to 4 from the blockchain. Further, the blockchain node 1 acquires, based on the acquired identities from the quantum key management device in the quantum key distribution node 1 connected to the blockchain node 1, the shared quantum key between the blockchain nodes 1 and 2, the shared quantum key between the blockchain nodes 1 and 3, the shared quantum key between the blockchain nodes 1 and 4, and the shared quantum key between the blockchain nodes 1 and 5. Further, the quantum key management devices, in the quantum key distribution nodes 2 to 4 that are connected to blockchain nodes 2 to 4, provides the blockchain nodes 2 to 4 with the shared quantum key between the blockchain nodes 2 and 1, the shared quantum key between the blockchain nodes 3 and 1, the shared quantum key between the blockchain nodes 4 and 1, and the shared quantum key between blockchain nodes 5 and 1, respectively.

In the secure communication step, the blockchain node 1 encrypts, for example, with one-time pad using the XOR encryption algorithm the exclusive OR encryption algorithm, the to-be-broadcasted information data using shared quantum key between the blockchain nodes 2 and 1, the shared quantum key between the blockchain nodes 3 and 1, the shared quantum key between the blockchain nodes 4 and 1, and the shared quantum key between blockchain nodes 5 and 1 to generate ciphertext data, respectively. Further, the blockchain node 1 generates message authentication codes (for example, using an HMAC or a CBC MAC algorithm) based the to-be-broadcasted information data and the shared quantum keys, and broadcasts the message authentication codes and the ciphertext data to the blockchain nodes 2, 3, 4 and 5, respectively.

The blockchain nodes 2, 3, 4 and 5 each decrypt the received ciphertext data using the corresponding shared quantum key to obtain the plaintext of the broadcast message, generate a message authentication code based on the shared quantum key and the broadcast message, and compare the generated message authentication code with the message authentication code received from the blockchain node 1. If the generated message authentication code is consistent with the received message authentication code, the corresponding blockchain nodes 2, 3, 4 and 5 verifies that the message is from the blockchain node 1 and has integrity.

According to the present disclosure, the secure communication method employing a quantum key is provided, and applied a blockchain network combining the QKD technology and the blockchain technology. The data can be securely transmitted between blockchain nodes using the quantum key instead of the classical symmetric key, to eliminate the resulting risk of data theft since the computing capability advances or classical random number is predictable. The key for encryption is from the quantum key distribution subnet which allows a key in any length to be encrypted with one-time pad using the XOR encryption algorithm. Therefore, the problem of relatively low efficiency in encryption and decryption using the asymmetric key algorithm, and poor security resulted from the failure to encrypt data with one-time pad using the XOR encryption algorithm because the symmetric key distributed using the asymmetric key algorithm is relatively short and dependent on symmetric encryption algorithms such as 3DES and AES can be solved.

Although the present disclosure has been described above through specific embodiments in conjunction with the drawings, the above-mentioned embodiments are illustrative only for illustrating the concept of the present disclosure, rather than limiting the scope of the present disclosure. Various combinations, modifications, and equivalent substitutions to the above-mentioned embodiments without departing from the spirit and scope of the present disclosure.

The invention claimed is:

1. A secure communication method, applied to a quantum-secured blockchain network, wherein the blockchain network comprises a blockchain subnet and a quantum key distribution subnet, the blockchain subnet comprises a plurality of blockchain nodes, the quantum key distribution subnet comprises a plurality of quantum key distribution nodes deployed in the blockchain nodes and connected to the blockchain nodes respectively, and the secure communication method comprises:

a quantum key distribution step for generating a shared quantum key between two of the quantum key distribution nodes;

a connection information upload step for uploading correspondence of the blockchain node to a quantum key management device in the quantum key distribution node connected to the blockchain node to the blockchain subnet;

a quantum key acquisition step for acquiring the shared quantum key by the blockchain node from the quantum key distribution node connected to the blockchain node, based on a communication service; and a secure communication step for securely transmitting transmission data by the blockchain nodes using the shared quantum key, wherein the quantum key acquisition step comprises: acquiring an identity of the quantum key management device in a receiver from the blockchain subnet by a sender, and acquiring the shared quantum key for the sender and the receiver based on the identity by the sender from the quantum key management device in the quantum key distribution node deployed in the sender; and acquiring the shared quantum key from the quantum key management device by the receiver based on the identity, wherein the sender and the receiver are among the blockchain nodes.

2. The secure communication method according to claim 1, wherein the blockchain nodes comprise a terminal device and a blockchain node server, and the quantum key acquisition step comprises:
- injecting, by the same quantum key distribution node, a quantum random number or a quantum key to the terminal device and the blockchain node as the shared quantum key, in a case that the terminal device and the blockchain node server are connected to the same quantum key distribution node; or
- distributing the shared quantum key to the terminal device and the blockchain node server by quantum key management devices in the respective quantum key distribution nodes, in a case that the terminal device and the blockchain node server are connected to the different quantum key distribution nodes.

3. The secure communication method according to claim 2, wherein the secure communication step comprises:
- encrypting communication data using the shared quantum key for the blockchain node server to generate ciphertext data, and generating a message authentication code based on the shared quantum key and the communication data, by the terminal device; and
- decrypting the ciphertext data using the shared quantum key to obtain the communication data, generating a message authentication code based on the shared quantum key and the communication data, and comparing the generated message authentication code with the received message authentication code, by the blockchain node server.

4. The secure communication method according to claim 1, wherein the secure communication step comprises:
- encrypting the communication data using the shared quantum key for the receiver to generate ciphertext data, and generating a message authentication code based on the shared quantum key and the communication data, by the sender; and
- decrypting the ciphertext data using the shared quantum key to obtain the communication data, generating a message authentication code based on the shared quantum key and the communication data, and comparing the generated message authentication code with the received message authentication code, by the receiver.

5. The secure communication method according to claim 3, wherein
- the communication data is encrypted with one-time pad using an XOR encryption algorithm; and/or
- the message authentication code is generated using a (hash-based message authentication code) (HMAC) algorithm or a cipher block chaining message authentication code (CBC MAC) algorithm; and/or
- the communication data comprises one or more of transaction information broadcast data, transaction information verification broadcast data, and shared data.

6. The secure communication method according to claim 1, wherein the quantum key distribution subnet comprises:
- a user terminal node for providing the shared quantum key to a user device;
- a trusted relay node for relaying the shared quantum key between two quantum key distribution nodes that are not directly connected; and
- a centralized control node, wherein the centralized control node is a trusted relay node where a control server is deployed.

7. The secure communication method according to claim 6, wherein
- the centralized control node and the trusted relay node are further for providing the shared quantum key to the user device; and/or
- at least two of the quantum key distribution nodes comprise a quantum satellite ground station for establishing a free space link with a quantum satellite.

8. The secure communication method according to claim 1, wherein adjacent quantum key distribution nodes communicate with each other through an optical fiber link or a free space link.

9. The secure communication method according to claim 1, wherein
- a quantum key distribution node comprising a mobile quantum satellite ground station is deployed in a mobile blockchain node.

10. The secure communication method according to claim 4, wherein
- the communication data is encrypted with one-time pad using an XOR encryption algorithm; and/or
- the message authentication code is generated using a (hash-based message authentication code) (HMAC) algorithm or a cipher block chaining message authentication code (CBC MAC) algorithm; and/or
- the communication data comprises one or more of transaction information broadcast data, transaction information verification broadcast data, and shared data.

* * * * *